E. NALL.
MACHINE FOR MAKING FLAPS FOR PNEUMATIC TIRES.
APPLICATION FILED JAN. 7, 1915.

1,250,338.

Patented Dec. 18, 1917.
3 SHEETS—SHEET 1.

Inventor
EDWARD NALL

Witnesses
Will E State
Curt Knentzel

Attorney

E. NALL.
MACHINE FOR MAKING FLAPS FOR PNEUMATIC TIRES.
APPLICATION FILED JAN. 7, 1915.

1,250,338.

Patented Dec. 18, 1917.
3 SHEETS—SHEET 2.

Witnesses
Will L. State
Curt Knentzel

Inventor
EDWARD NALL
By C. E. Humphrey,
Attorney

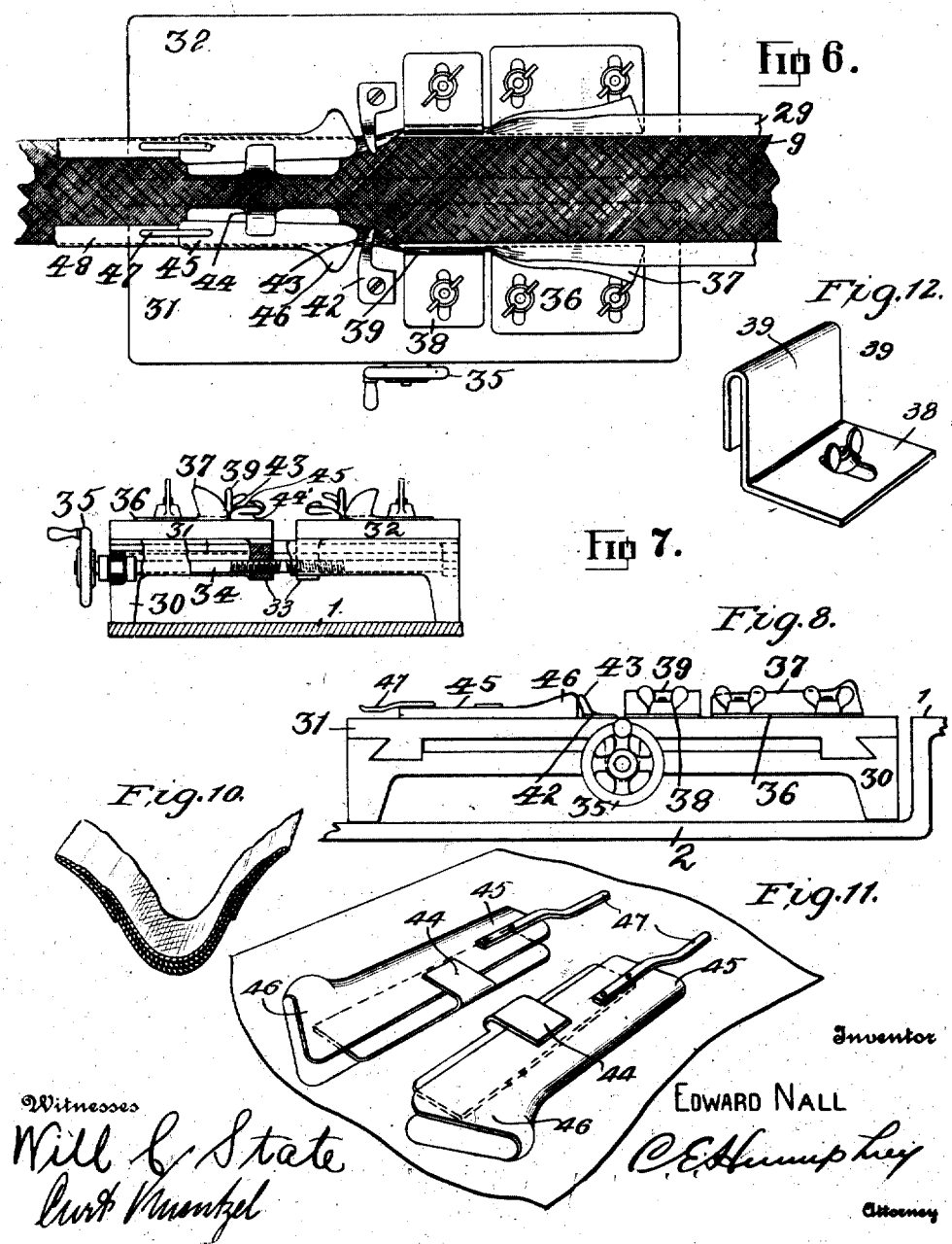

UNITED STATES PATENT OFFICE.

EDWARD NALL, OF AKRON, OHIO, ASSIGNOR TO THE GOODYEAR TIRE AND RUBBER COMPANY, OF AKRON, OHIO, A CORPORATION OF OHIO.

MACHINE FOR MAKING FLAPS FOR PNEUMATIC TIRES.

1,250,338.   Specification of Letters Patent.   Patented Dec. 18, 1917.

Application filed January 7, 1915. Serial No. 1,044.

*To all whom it may concern:*

Be it known that I, EDWARD NALL, a citizen of the United States, residing at Akron, in the county of Summit and State of Ohio, have invented new and useful Improvements in Machines for Making Flaps for Pneumatic Tires, of which the following is a specification.

This invention relates to improvements in machines for manufacturing what are known as "flaps" or V-shaped strips of suitable material which are positioned within the outer casing of a double-tube pneumatic tire and outside of the inner tube to prevent the latter from being injured by rubbing or chafing against the edges of the open portions of the outer casing and also with the rim on which the tire is mounted. These flaps are usually constructed of one or more layers of fabric saturated with unvulcanized rubber, and in cases where two or more are used they are superposed one upon the other and both placed or mounted centrally on a strip of muslin or its equivalent which is considerably wider than the saturated fabric, after which the projecting edges of the muslin are folded over onto the upper surface of the saturated fabric and caused to adhere thereto. It is highly desirable in making flaps that the bend or fold of the muslin shall take place along a line removed from the edge of the rubber saturated fabric, to the end that a fold of soft muslin, constituting a cushion, is produced beyond the edge of the stiff saturated fabric body, to guard against wear and chafing of the inner tubes such as might occur were the relatively stiff edges of the rubber saturated fabric, which forms the body of the flap, allowed to contact with the tube. Heretofore these flaps have been made by hand and in approximately the length intended for use, but their manufacture by hand has been attended with considerable expense due to the employment of hand labor and also the manufacture thereof has been necessarily slow for the same reason, and the finished product has not always been uniform.

The object of this invention therefore is to provide a machine by which the strips, completely fashioned and ready for use, may be made continuously whereby desired lengths thereof may be cut from the continuous length as required.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of a machine embodying this invention;

Fig. 6, is a plan view of a folding device employed;

Fig. 7, is an end view of the same looking from the right of Fig. 6;

Fig. 8, is a view in side elevation of the device shown in Fig. 6;

Fig. 10, is a view of the same "flap" after folding.

Fig. 11 is a perspective view of one element of the folding mechanism;

Fig. 12 is a perspective view of another element of the folding mechanism.

Figure 1:
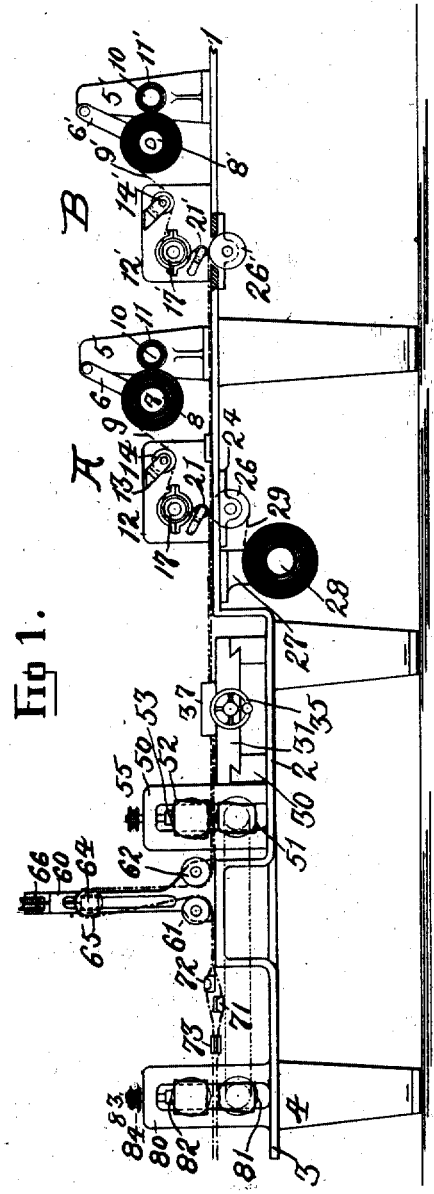
Figure 2:
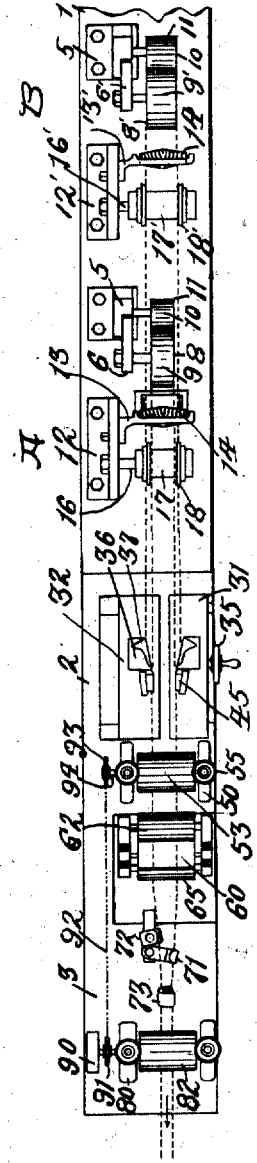
Fig. 2, is a plan view of the same.
Figure 9:
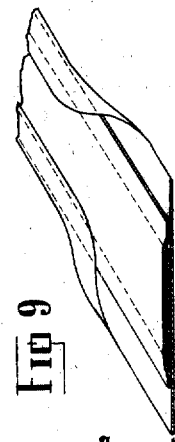
Fig. 9, is a view of a piece of the finished product before folding.

Referring to the drawings in detail, the reference numeral 1 denotes a table or platform, the upper face of which constitutes supporting means for the material during the manufacture of the flaps. The table 1 is provided with depressed portions 2 and 3 for purposes to be later described. The table 1 is supported by a plurality of legs 4. Mounted on the upper face of the table 1 and near the right end thereof are a plurality of sets of mechanism, two only of which are shown, and the two sets are designated generally for definiteness by the reference letters A and B. These two sets of mechanism are identical and hence, it is believed that a description of one will be sufficient for both, but in case any differences exist between them the different mechanisms will be defined by separate reference numerals. The mechanism denominated generally by the reference letter A, may be described as follows: Mounted on the upper face of the table 1 is a standard 5 near the upper end of which is pivotally secured an arm 6 bearing near its lower end a horizontal shaft 7 bearing a roller 8 on which is wound a continuous strip of rubber saturated fabric 9 in an unvulcanized condition between which and serving to prevent adhesion of the various layers, is a lining strip 10. Secured on a stub-shaft on the standard 5 is a rotatable roller 11 against which the roll of fabric 9 bears and onto which the lining strip winds up as the rubber fabric is unwound from the roll 8, the roll 11 with the lining strip being rotated by frictional engagement with the peripheral surface of the roll of fabric 9. Mounted to the left of and adjacent to the standard 5 is a second standard 12 to the upper portion of which is secured an arm 13 bearing a roller 14 having its greatest diameter at its center, from which the end portions gradually taper in opposite directions, so that the ends are considerably less in diameter than the center. The faces of these rollers are provided with a plurality of right and left hand helically-arranged grooves 15, that is to say, the peripheral face of the roller is grooved with the grooves running helically in one direction and with the opposite end of the roller grooved in an opposite direction. This roller 14 smooths and straightens out any wrinkles in the strip of fabric 9 and tends to work all slackness or unevenness laterally outwardly from the center toward the edges.

Secured to and projecting from the standard 12 is a shaft 16 on which is rotatably mounted a roller 17 having adjustable flanges 18 clamped to the peripheral face thereof near the sides. These flanges 18 are adjustable so as to adapt the roller to receive strips of fabric of different widths and they also serve as guiding means for a strip of fabric while passing around the roller 17. Pivotally mounted on the standard 12 is an oscillating arm 19 provided with a bifurcated free end in which is mounted a shaft 20 on which is an idler roller 21. Also loosely mounted on the shaft is an arm 22 which is adapted to swing into a vertical position when the arm 19 is raised to rest upon the table 1 to support the roller 21 above the upper face of the table. Immediately below the roller 21 the table is provided with a transverse slot 23. Secured to the under face of the table 21 at opposite ends of the slot 23 are a pair of bearings 24 in which is mounted a shaft 25 bearing an idler roll 26. The slot 23 is of sufficient width to permit the peripheral portion of the roller 26 to lie flush with the top of the table 1 or project above it a minute distance so that the roller 21 with its strip of fabric thereon would normally frictionally engage the upper face of the idler 26. Secured to the under face of the table and adjacent to the idler roller 26 is a hanger 27 bearing a supporting shaft for a roller 28 on which is a continuous strip of some thin fabric 29, generically called in this application "muslin". The strip 29 of muslin is preferably considerably wider than the strip of rubberized fabric 9.

Mounted on the upper face of the table 1 to the right of the mechanism generally denominated by the reference numeral A, just described, is a similar set of mechanism B generally denominated by the reference numeral B provided with an idler roller 21' below which is an idler roller 26' corresponding to the idler roll 26, but in this instance the idler roller 26 simply frictionally engages the fabric passing around the idler roller 21', but no strip of muslin is used in connection with this portion of the device. The stock-roller 8' employed in the mechanism denominated by the reference numeral B is equipped with a strip of rubberized fabric 9' and may be of a width different from the rubberized fabric 9 which is wound on the roller 8.

The operation of the device so far is as follows: The strip of fabric 9' is led from the stock-roller 8' around the smoothing and tensioning roller 14' and from thence around the roller 17' over the face of the idler roller 21' and from thence passes along the upper face of the table 1 to the left in Fig. 1. During this operation the lining strip 10' which is used in connection with the rubberized strip 9' is wound up on the roller 11'. The strip 9' as it moves to the left, passes over the idler roller 26, and is superposed on the wider strip of muslin 29 and is placed as centrally thereon as is possible, and at the same time, the strip of rubberized fabric 9 is led from the stock-roller 8 through the mechanism heretofore described and is in turn superposed on the upper face of the strip 9'. The three strips, viz., the wide strip of muslin, the second or intermediate strip of rubberized fabric 9', and the second strip of rubberized fabric 9, then pass forward to a device for folding the extended edges of the muslin strip over the lateral edges of one or both of the strips 9 and 9'.

First folding device.

This folding device is positioned in the depressed portion 2 of the table and comprises a supporting frame 30 provided in the upper face with dove-tailed ways in which are mounted for transverse shiftable movement a pair of carriages 31 and 32

(see Figs. 6, 7 and 8) both provided with downturned lugs 33 provided with alined and transversely-extending screw-threaded apertures with the screw-threads in one aperture oppositely inclined with respect to the threads in the other aperture. Mounted in the frame 30 is a shaft 34 provided with two screw-threaded portions of opposite inclinations which are adapted to engage in the threaded apertures in the lugs 33. The shaft 34 is provided with a hand operating wheel 35 by which rotation of the shaft 34 is secured for shifting the members 31 and 32 toward or away from each other, for regulating the distance between the folding mechanisms which are mounted thereon, so as to adjust the device for use in connection with the manufacture of flaps of different widths. The mechanism for folding the extended edges of the muslin strip over the lateral edges of the rubberized strip comprises two oppositely-disposed and identically similar mechanisms, each of which is mounted on its respective carriage, and as these mechanisms are similar it is thought that a description of one will be sufficient for both, and the description therefore will be confined to the mechanism mounted on the carriage 31. Secured to the upper face of the carriage 31 is a transversely adjustable plate 36 having along its inner edge, by which is meant the edge which is adjacent to the strip to be folded, an upturned integral flange 37 arranged at an inclination with respect to the plate 36 and with the inclinations at the left end thereof more nearly approaching the vertical than at the right end so that the flange 37 flares outwardly from the left end toward the right end, or in other words, assumes more nearly a horizontal position and the inclination becomes more nearly vertical in the direction of the line of movement of the strip of fabric to be acted upon. The projecting edges of the muslin strip 29 as they encounter the folding flange 37 are folded up nearly to a perpendicular position with respect to the upper face of the table, being gradually bent to this position by the gradual inclination of the member 37.

Adjacent to the plate 36 is a transversely adjustable plate 38 the inner edge of which is provided with an upwardly-extending inverted U-shaped flange 39 practically at right angles with respect to the plate 38 and with the upper end thereof rounded and with the inner end downwardly-bent to lie in approximate parallelism with the portion which is attached to the plate 38. By this flange a narrow slot-like opening is provided through which a projecting edge of muslin 29 passes. It will be noted that the downward-bent inner end of the member 39 is positioned a slight distance away from the marginal edge of the strip of rubberized fabric so that the bend, which ultimately becomes the fold line in the projecting portion of the muslin strip 29, is at a distance from the marginal edge of the rubberized fabric. Adjacent to the plate 38 is a plate 42 provided with an inwardly-extending finger 43, the function of which is to commence the folding over of the upwardly-extending portion of the projecting edge of the strip 29 which has been held in a vertical position by the member 39. To the left of the plate 42 is a plate 44 approximately U-shaped in cross section with one of the arms thereof secured to the table 1 and the other 45 projecting over the upper portion of the rubberized fabric strip. The inner edge of the upper member is provided with an outwardly-extending shelf 44' extending parallel with the upper surface of the member 31 to constitute a guide and support for the muslin strip which passes to it from the fingers 42. The member 45 has a flared end 46 to guide the muslin and is provided with a downwardly-acting spring 47 at its opposite end to engage the muslin strip and press it downwardly upon the upper face of the rubberized fabric. As the combined and now united strips of rubberized fabric and muslin leaving the left end of the channel between members 44 and 45 the springs 47 press downwardly on the folded portion 48 of the muslin causing it to adhere to the sticky upper face of the rubberized fabric strip.

Mounted in the depressed portion 2 of the table 1 to the left of the folding device just described, are a pair of upright housings 50, rotatably mounted in the lower portions of which is a roller 51 so positioned that the upper portion of the peripheral face thereof is approximately flush with the upper face of the table 1 and also with the upper face of the members 31 and 32. The housings above the floor 51 are provided with vertical openings in which are mounted bearings 52 for a roll 53 which is adapted to coöperate with the roll 51 for squeezing and pressing the strip as it passes between them for causing perfect adhesion of the bent-over portions of the muslin with the sticky rubberized fabric. The bearings 52 are vertically shiftable through the medium of threaded shafts 54 on which are nuts 55 the outer surfaces of which constitute worm-wheels for engagement with a worm on a shaft 56 operated by a hand wheel 57. The sole function of these rolls 51 and 53 is to smooth out the fabric and cause a perfect union between all parts.

To the left of the housings 50 and mounted on the raised portion of the table 1 between the depressed portions 2 and 3 are a pair of housings 60, extending between the lower portions of which are a pair of rotatable rolls 61 and 62 spaced apart and positioned adjacent to the upper face of the table 1. The upper portions of these housings are provided with vertical slots 63 in which are slidably mounted bearings 64 for a vertically-shiftable tension roll 65. Secured to the upper portions of the housings are pulleys 66 over which extend flexible members 67 to which are attached counterweights 68. The outer end of each flexible member is secured to one of the bearings 65. The composite strip of material after passing between the pressure rolls 51 and 53 is carried around the roll 63 and then given a semi-twist at 69 from whence it passes around the tension roller 65 and from thence downwardly in an inverted position around the roller 61. During the passage of the composite strip past this mechanism sufficient tension is imposed on the strip to take up any slackness which may exist and it is also turned over so that the rubberized portion is on the under face of the strip.

Secured on a bracket 70 to one of the side walls of the table which forms a portion of the depressed portion 3 are a pair of folding members 71 and 72 the functions of which are to commence the folding of the now completed composite strip into a U-formation in cross section and the members 71 and 72 are designed to impart the initial bending or folding of the strip into this formation. To the left of the members 71 and 72 and secured to the bracket 70 is a U-shaped folding device 73, the function of which is to complete the folding of the strip into the form which it is desired it shall ultimately assume, and the member 73 comprises simply a bent piece of metal having a U-shaped opening through which the partially bent or folded fabric passes. Mounted on the depressed portion 3 of the table 1 and also to the left of the member 73 are a pair of upright housings 80 similar to the housings 50 supporting with a lower roll 81 and an upper shiftable roll 82 capable of being vertically adjusted by means of threaded shafts 83 operated by means of worm-wheel nuts 84 and a hand-wheel 85 on a shaft 86 bearing worms for engagement with the worm-wheels 84. The function of these rolls 81 and 82 is to further the bent or folded flap and impart thereto a permanent set so that as it leaves these rolls it may be wound up in a folded condition on a reel for the market.

On the shaft of the roll 81 is a belt-pulley 90 and also a sprocket wheel 91 over which runs a sprocket chain 92 to a sprocket wheel 93 on a shaft 94 of the roll 51 so that the rolls in the two housings 50 and 80 are adapted to move in unison.

Figure 3:
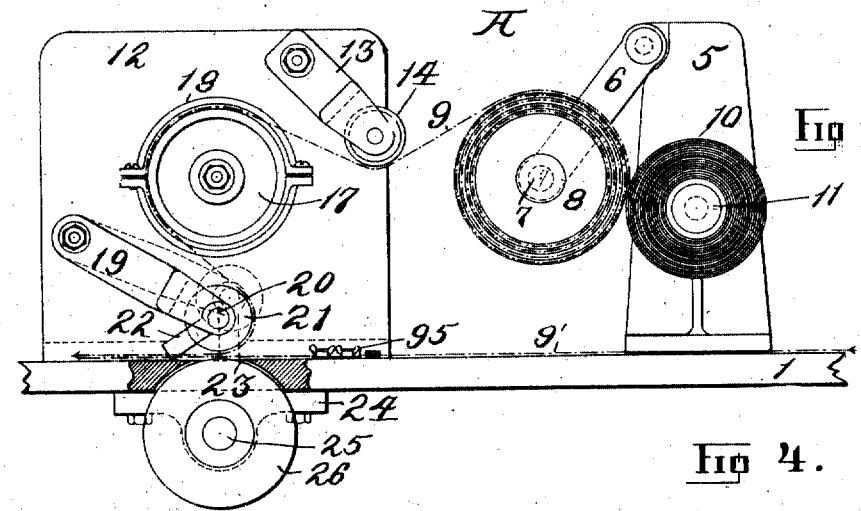
Fig. 3, is a view in side elevation enlarged of a portion of the feeding mechanism for supplying material for the "flap"
Figure 4:
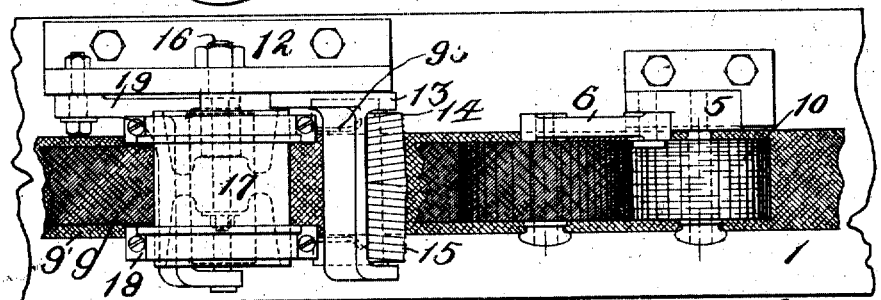
Fig. 4, is a plan view of the device shown in Fig. 3.
Figure 5:
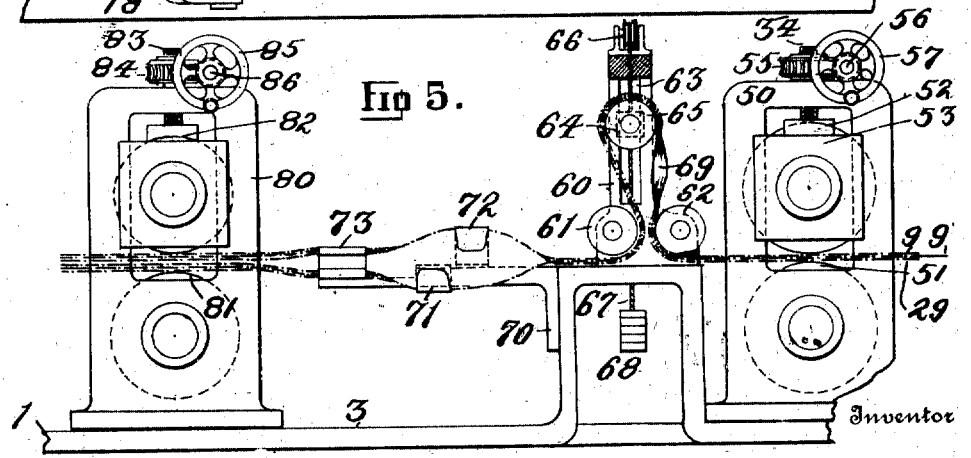
Fig. 5, is a view partly in side elevation and partly in section of a portion of a folding mechanism of the machine.

It is often desirable in using this device to provide along the upper face of the table 1 a plurality of guides for the moving strip, and one of these guides 95 is shown in Figs. 3 and 4, but of course, the number may be increased and they may be positioned at any suitable place where their use may be required.

Attention is directed to the fact that after leaving the pressure rolls 81 and 82 the product of continuous flap is folded in a U-formation with the muslin or stockinet layer on the inside and the rubberized fabric, which will ultimately engage the rim and the inner faces of the outer casing of the tire, on the outside, so that the soft stockinet is in contact with the soft and delicate inner tube of the tire, and at the same time the projecting portions of the bent-over parts 48 of the stockinet constitute a soft cushioning element for covering the rough and sometimes ragged edges of the rubberized strip, to prevent the inner tube from being chafed or injured thereby.

It will be understood that the laminated strip as built up by the present machine is wound upon a drum immediately after it is passed between the rollers 81 and 82. This drum is power driven and acts as the means for drawing the plies of fabric through the machine.

I claim:—

1. A machine for making flaps continuously comprising means for superposing a strip of rubberized fabric upon a wider strip of unrubberized fabric to permit the lateral portions of the latter to project beyond the former, relatively stationary means for folding the projecting edges over the contiguous portions of the rubberized fabric with the folded lines in the unrubberized fabric laterally removed from the edges of the rubberized fabric, means to cause the folded-over portions of the unrubberized fabric to adhere to the rubberized fabric, and means to bend the composite product into a U-formation in cross section and impart a permanent set thereto prior to the winding of the product upon a drum.

2. A machine for making flaps continuously comprising means for superposing a strip of rubberized fabric upon a wider strip of unrubberized fabric, relatively stationary means to fold the laterally-projecting edges of the unrubberized fabric over the contiguous portions of the rubberized fabric, with the folded lines of the unrubberized fabric lying parallel to but removed from the edges of the rubberized fabric, means for causing the adhesion of the two strips together, and means for imparting a U-shaped formation in cross-section to the composite product.

3. A machine for making laminated flaps including means for superposing strips of fabric, said strips of fabric being adapted for union through the agency of an adhesive material; and means whereby the flap formed from the superposed strips may be given a relatively permanent approximately U shaped conformation in cross-section prior to the winding of the flap on a drum.

4. A machine for making flaps including means for superposing a strip of rubberized fabric on another strip of unrubberized fabric, said unrubberized fabric being wider than the rubberized strip; and relatively stationary means positioned to fold the projecting edge portions of the wider strip over onto the other strip and to positively induce the formation of the folded lines along lines parallel to and laterally spaced from the longitudinal edges of the second mentioned strip, when the superposed strips are drawn through the machine.

5. A machine for making flaps including means for superposing a strip of rubberized fabric on another strip of unrubberized fabric, said strip of unrubberized fabric being of greater width than the rubberized strip; relatively stationary means positioned to fold the projecting edge portions of the wider strip over onto the other strip and to positively induce the formation of the folded lines along lines parallel to and laterally spaced from the longitudinal edges of the second mentioned strip, said folding means being adjustable for increasing or decreasing the space between them whereby said folding means may be relatively adjusted to accommodate flaps of different widths; and means for holding said folding means in adjusted position.

6. A machine for making flaps including means for superposing a strip of rubberized fabric upon another strip of fabric, one of said strips being wider than the other; folding means positioned to fold the projecting edge portions of the wider strip over onto the other strip and to positively induce the formation of the folded lines along lines parallel to and laterally spaced from the longitudinal edges of the second mentioned strip.

7. A machine for making laminated flaps including means for superposing one strip of material upon another strip of material, one of said strips being a greater width than the other strip and having each of its longitudinal edge portions projecting beyond the longitudinal edges of the other strip when said strips are superposed; means for moving the strips through the machine; and folding means positioned to fold the projecting edge portions of the first strip over onto the second strip and to positively induce the formation of the folded lines along lines parallel to and laterally spaced from the longitudinal edges of the second mentioned strip.

8. A machine for making laminated flaps including means for superposing one strip of material upon another strip of material, one of said strips being of greater width than the other strip and having each of its longitudinal edge portions projecting beyond the longitudinal edges of the second strip when said strips are superposed; a pair of plates inclined to the plane of the path of movement of the strips for initiating the folding over of the edge portions of the wider strip; a pair of substantially U shaped folding members disposed to act upon the edge portions of the wider strip subsequent to the action by the said plates for furthering the folding initiated by said plates and yieldable elements positioned on opposite sides of the moving strips and disposed to engage the edge portions of the wider strip of fabric, subsequent to their withdrawal from the U shaped folding elements, for pressing said edge portions down upon the other strip of fabric.

9. A machine for making laminated flaps including means for superposing a relatively wide strip of material upon a relatively narrow strip of material, one of said strips being rubberized; means for moving the strips of material through the machine; a pair of plates inclined to the plane of the path of movement of the strips; a pair of U shaped folding members disposed to act upon the edge portions of the wider strip, subsequent to the action by the said plates for turning the edge portions of the wider strip into a substantial vertical position; and means positioned to act subsequent to the action by the said U shaped folding members for pressing the edge portions down upon and adhering them to the narrower strip.

In testimony whereof I have hereunto set my hand in presence of two subscribing witnesses.

EDWARD NALL.

Witnesses:
C. H. McCombs,
H. B. Hamlen.